US007496459B2

(12) United States Patent
McAllister et al.

(10) Patent No.: US 7,496,459 B2
(45) Date of Patent: Feb. 24, 2009

(54) INTELLIGENT, SELF-PROPELLED AUTOMATIC GRID CRAWLER HIGH IMPEDANCE FAULT DETECTOR AND HIGH IMPEDANCE FAULT DETECTING SYSTEM

(75) Inventors: Sarah C. McAllister, Baton Rouge, LA (US); Thomas J. Nowicki, Fort Montgomery, NY (US); Grzegorz M. Swirszcz, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/695,700

(22) Filed: Apr. 3, 2007

(65) Prior Publication Data

US 2008/0249723 A1 Oct. 9, 2008

(51) Int. Cl.
*G01R 31/00* (2006.01)
*G06F 19/00* (2006.01)
(52) U.S. Cl. ........................................ 702/59; 700/245
(58) Field of Classification Search .................. 702/59, 702/33, 35, 36; 700/56, 60, 61, 64, 245; 324/512, 513, 531; 414/23; 701/207, 213, 701/214; 340/500, 540, 635, 650, 657–664, 340/870.01, 870.07, 870.16
See application file for complete search history.

(56) References Cited

OTHER PUBLICATIONS

Sawada et al., A Mobile Robot for Inspection of Power Transmission Lines, Jan. 1991, IEEE Transactions on Power Delivery, vol. 6, No. 1, pp. 309-315.*

Jiang et al., Robotic Monitoring of Power Systems, Jul. 2004, IEEE Transactions on Power Delivery, vol. 19, No. 3, pp. 912-918.*
Wang et al., Development and Control of an Autonomously Obstacle-Navigation Inspection Robot for Extra-High Voltage Power Transmission Lines, Oct. 18-21, 2006, SICE-ICASE International Joint Conference, Busan, Korea.*
Sun et al., 3D Simulation and Optimization Design of a Mobile Inspection Robot for Power Transmission Lines, Jun. 21-23, 2006, Proceedings of the 6th World Congress on Intelligent Control and Automation, Dalian, China.*

* cited by examiner

*Primary Examiner*—Edward R Cosimano
*Assistant Examiner*—Toan M Le
(74) *Attorney, Agent, or Firm*—Whitham, Curtis, Christofferson & Cook, PC; Stephen C. Kaufman

(57) ABSTRACT

A self-propelled, automated, autonomic grid crawler which, when attached to a wire, moves along the wire to sense conditions of the wire. The grid crawler includes a central processing unit (CPU), working memory, such as random access memory (RAM), persistent money, such as read only memory (ROM) and hard drive (HD), sensor electronics, a wireless interface, a location device, such as a global positioning satellite (GPS) receiver, motive power system, and a battery. The sensor electronics serves to sense various types of faults. The CPU analyzes the data from the sensor electronics using pre-analysis and pre-qualification algorithms, which are stored in the HD. Depending on the results of the analysis, the CPU transmits information to the central station, either directly or indirectly via mounted docking devices, that potentially indicates a fault, including the location of the fault as determined by the GPS receiver. The pre-processing and pre-qualifying of the data at the autonomic grid crawler limits the amount of data that needs to be transmitted to the central station, thereby saving battery power.

13 Claims, 3 Drawing Sheets

FRONT VIEW

FRONT VIEW

TOP VIEW

TOP VIEW

INTELLIGENT, SELF-PROPELLED AUTOMATIC GRID CRAWLER HIGH IMPEDANCE FAULT DETECTOR AND HIGH IMPEDANCE FAULT DETECTING SYSTEM

BACKGROUND OF THE INVENTION

1. Field of the Invention

The present application generally relates to the detection of high-impedance faults in electrical power grids and, more particularly, to a self-propelled, automated, autonomic mechanical device which, when attached to a power network wire, travels along the wire and is able to recognize basic states of the wire and communicates the state of the wire to a control center.

2. Background Description

High impedance faults are costly, dangerous to the equipment and a threat to human life. There is a huge diversity of phenomena classified as high impedance faults. These include, but are not limited to, a downed line, a tree branch touching a line, a broken insulator, and improper installation. As a result, there is no accepted scientific knowledge about the nature of high impedance fault detection.

Electrical power grids are extremely complicated, making the detection and localization of a high impedance fault difficult and problematic. Current methods of detection include circuit breakers tripping, readout from meters at the substation by human operators, and a telephone call from someone who noticed a fault. Interestingly, the last of these methods, e.g., a telephone call, is the most common method by which faults are detected and located. There have been attempts to use local sensors that automatically make a decision and either raise an alarm or disconnect a part of the grid. These attempts have proven to be unsatisfactory due to the lack of processing power and the ability to flexibly adapt to the specifics of a particular environment.

SUMMARY OF THE INVENTION

According to the present invention, there is provided a self-propelled, automated, autonomic mechanical device which is able to attach itself to and travel along a power network wire. The device is able to recognize basic states of the wire such as in order,
 broken,
 in contact with an obstacle,
 current and voltage,
 ion concentrations,
 organic residues on wires, among others. The device communicates the state of the wire directly or indirectly through a docking station to a control center. Based on reports received at the control center, decisions about further investigation, such as sending a repair crew, disconnecting part of the power network, etc., are made automatically or by human operators at the control center. In the preferred practice of the invention, a plurality of self-propelled, automated, autonomic grid crawlers are deployed throughout the power grid, and each of these grid crawlers communicates either directly or indirectly with the control center.

In the preferred embodiment, the self-propelled, automated, autonomic grid crawler comprises a plurality of articulated rollers from which the main body of the device is suspended. The main body of the device contains a central processing unit (CPU), working memory, such as random access memory (RAM), persistent memory, such as read only memory (ROM) and hard drive (HD), sensor electronics, a wireless interface, a location device, such as a global position satellite (GPS) receiver, motive power system for the rollers, and a battery. The HD may contain data of the topography of the grid which is being inspected, and the CPU accesses this data to direct the autonomic grid crawler along the grid which is to be inspected. This data may be updated and downloaded from a central station over the wireless interface. As the device moves along a cable, when an obstacle such as an insulator, is encountered, the motive power system causes first one, then the next and the next roller and so on to articulate so as to avoid the obstacle. The sensor electronics serves not only to sense obstacles such as insulators but also to sense various types of faults.

The CPU analyzes the data from the sensor electronics and, after pre-qualification, transmits information to the central station that potentially indicates a fault. This information includes the location of the fault as determined by the GPS receiver. The HD stores algorithms which the CPU uses to perform fast pre-analysis and pre-qualifying of sensor electronics readouts. Whenever the readouts are identified as indicators of a potential fault, the transmission of data to the central station is initiated. The pre-processing and pre-qualifying of the data at the autonomic grid crawler limits the amount of data that needs to be transmitted to the central station, thereby saving battery power. The central station performs a comparative analysis of readouts from multiple locations in the network.

There are many advantages to the approach taken by the present invention. These include automatic detection and localization of high impedance faults, high accuracy, fast response, flexibility and adaptability.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
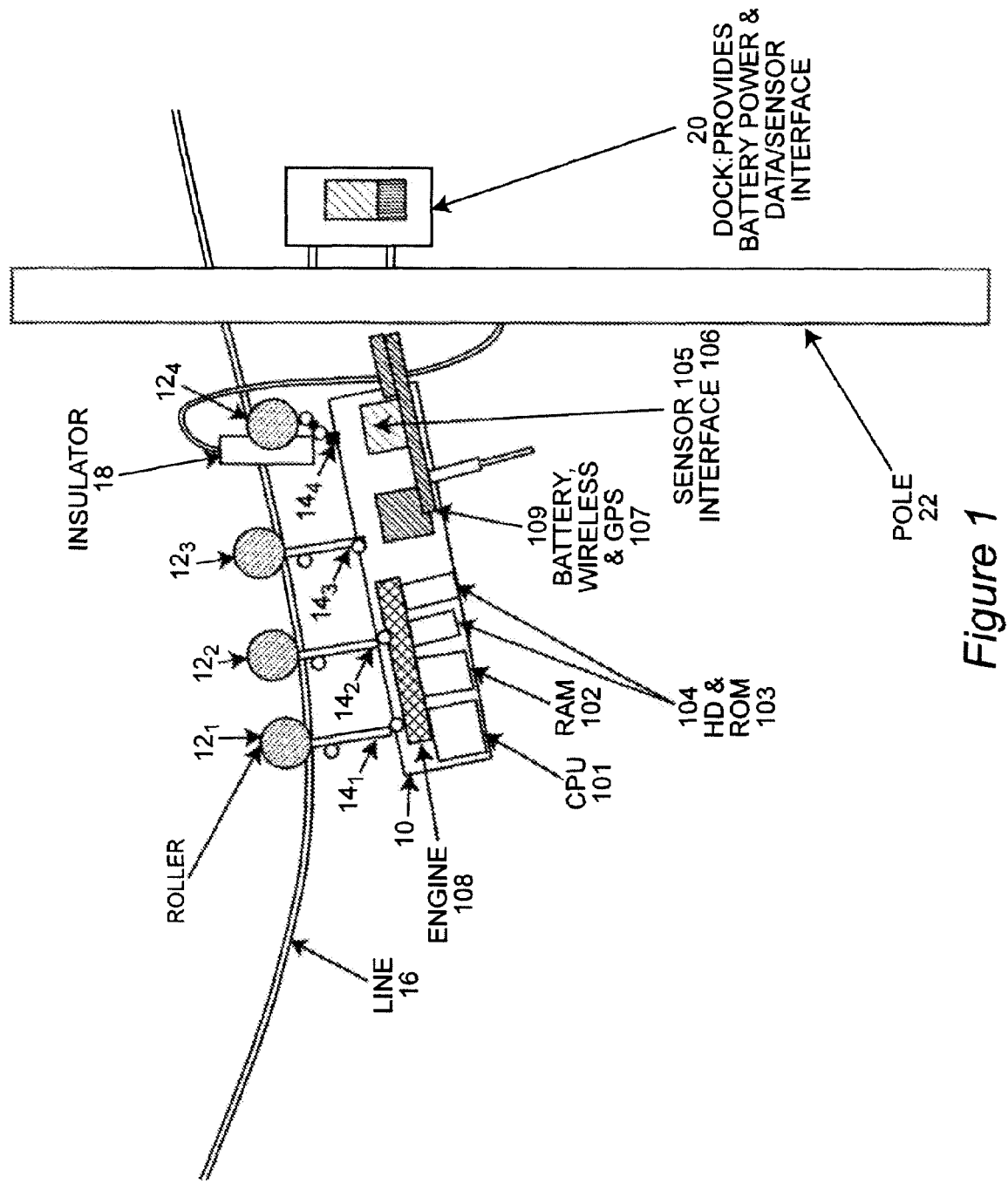
FIG. 1 is a diagrammatic side view of the grid crawler according to a preferred embodiment of the invention.

Referring now to the drawings, and more particularly to FIG. 1, there is illustrated a diagrammatic side view of the autonomic grid crawler according to a preferred embodiment of the invention. It should be understood in the following description that while a single such grid crawler is described, a practical system would include many such grid crawlers operating within various sections of the power grid.

The main body 10 of the grid crawler is suspended by a plurality of articulated rollers $12_1$, $12_2$, $12_3$, and $12_4$. Four rollers are shown in this embodiment, but at least three are required and more may be used as will become clear from the following description. Each of these rollers is connected to the main body 10 by articulated arms, $14_1$, $14_2$, $14_3$, and $14_4$, respectively. The four rollers $12_1$, $12_2$, $12_3$, and $12_4$ engage a cable 16 along which they roll under power supplied by individual electric motors, not shown.

Figure 2B:
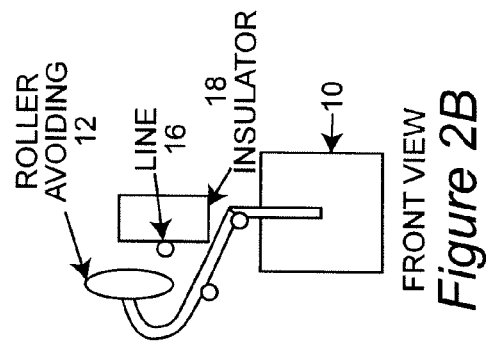
FIGS. 2A and 2B are front views of the grid crawler showing a roller on a power line and a roller articulated off the power line to avoid an insulator, respectively.
Figure 2A:
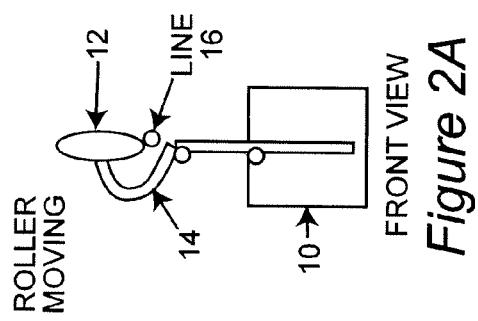
Figure 3B:
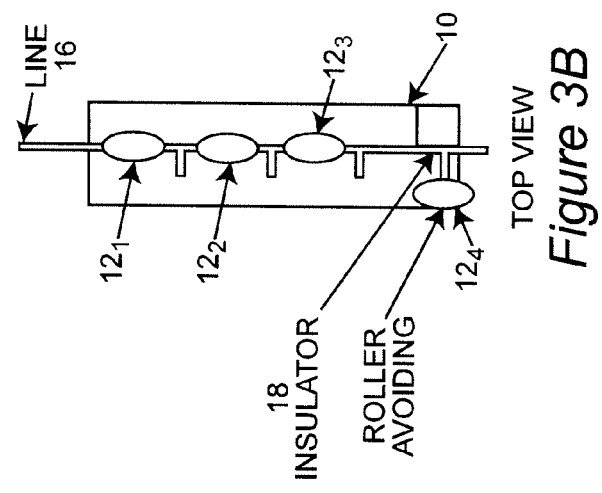
FIGS. 3A and 3B are top views of the grid crawler showing rollers on a power line and one roller articulated off the power line to avoid an insulator, respectively.
Figure 3A:
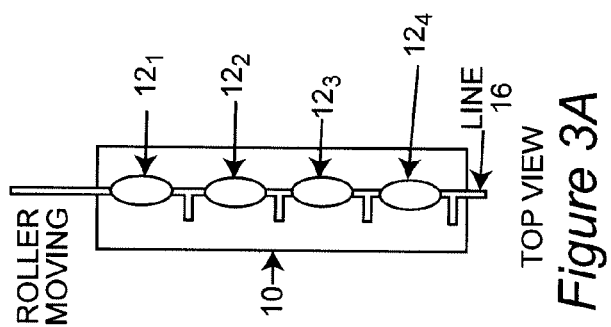

As the autonomic grid crawler moves along the cable, it will encounter insulators as obstacles. Referring to FIGS. 2A and 2B and FIGS. 3A and 3B, the operation for navigating around these insulators will be described. When the lead roller, say $12_1$, encounters an insulator 18, this will be sensed and the articulated arm $14_1$ for roller $12_1$ will be moved to avoid the insulator, as shown in FIGS. 2A and 3A. As the roller $12_1$ passes the insulator, its articulated arm $14_1$ moves the roller back into contact with the cable 16. Meanwhile, roller $12_2$ will encounter the insulator 18, and its articulated arm $14_2$ will move it to avoid the insulator. The process is continued for each roller in turn, until the autonomic grid crawler has passed the insulator 18 and can again move freely along the cable 16 as shown in Figs. 2B and 3B. It will be understood that the autonomic grid crawler can move in either direction so that in a return path the lead roller would be roller $12_4$, but the process of navigating around cable insulators would be exactly the same.

Returning again to FIG. 1, the main body 10 of the autonomic grid crawler contains a central processing unit (CPU) 101, working memory, such as random access memory (RAM) 102, persistent memory, such as read only memory (ROM) 103 and hard drive (HD) 104, sensor electronics 105, a wireless interface 106, a location device, such as a global position satellite (GPS) receiver 107, motive power system 108 for the rollers, and a battery 109. While the persistent memory has been illustrated in this embodiment as ROM 103 and HD 104, those skilled in the art will recognize that other forms of persistent memory may be substituted, such as flash memory, microdrive cards, and the like. Moreover, for maintenance and upgrading purposes, the persistent memory may be removable, possibly in the form of a PCMCIA (Personal Computer Memory Card International Association) card or other such interface.

The HD 104 may contain data of the topography of the grid which is being inspected, and the CPU 101 accesses this data to direct the autonomic grid crawler along the grid which is to be inspected. This data may be updated and downloaded from a central station over the wireless interface 106. The HD 104 also contains the programs which are executed by the CPU 101, including pre-analysis and pre-qualifying algorithms. The ROM 103 stores firmware including the basic input/output system (BIOS).

The sensor electronics 105 serves not only to sense obstacles such as insulators but also to sense various types of faults and conditions of the wire being traversed. The data from the sensor electronics 105 is input to the CPU 101. The CPU 101 analyzes this data using the pre-analysis and pre-qualifying algorithms stored in the HD 104. After pre-qualification, the CPU 101 stores this data in HD 104 for later transmission, either directly via the wireless interface 106 or via a dock, to the central station. The information transmitted potentially indicates a fault and includes the location of the fault as determined by the GPS receiver 107. Alternatively, whenever the readouts from the sensor electronics 106 are identified as indicators of a potential fault, the transmission of data to the central station is initiated. The pre-processing and pre-qualifying of the data at the autonomic grid crawler limits the amount of data that needs to be transmitted to the central station, thereby saving battery power. The central station performs a comparative analysis of readouts from multiple locations in the network.

As the grid crawler moves along a wire of the grid, it will encounter a dock 20 mounted on a pole 22. There will be a plurality of docks 20, but these are not mounted on every pole. Rather, docks are spaced at intervals and derive their power directly from the power grid. The primary function of a dock is to recharge the battery of the gird crawler. In addition, the dock can serve to transmit data gathered by the grid crawler to the central station, thereby conserving the crawler battery power.

Figure 4:
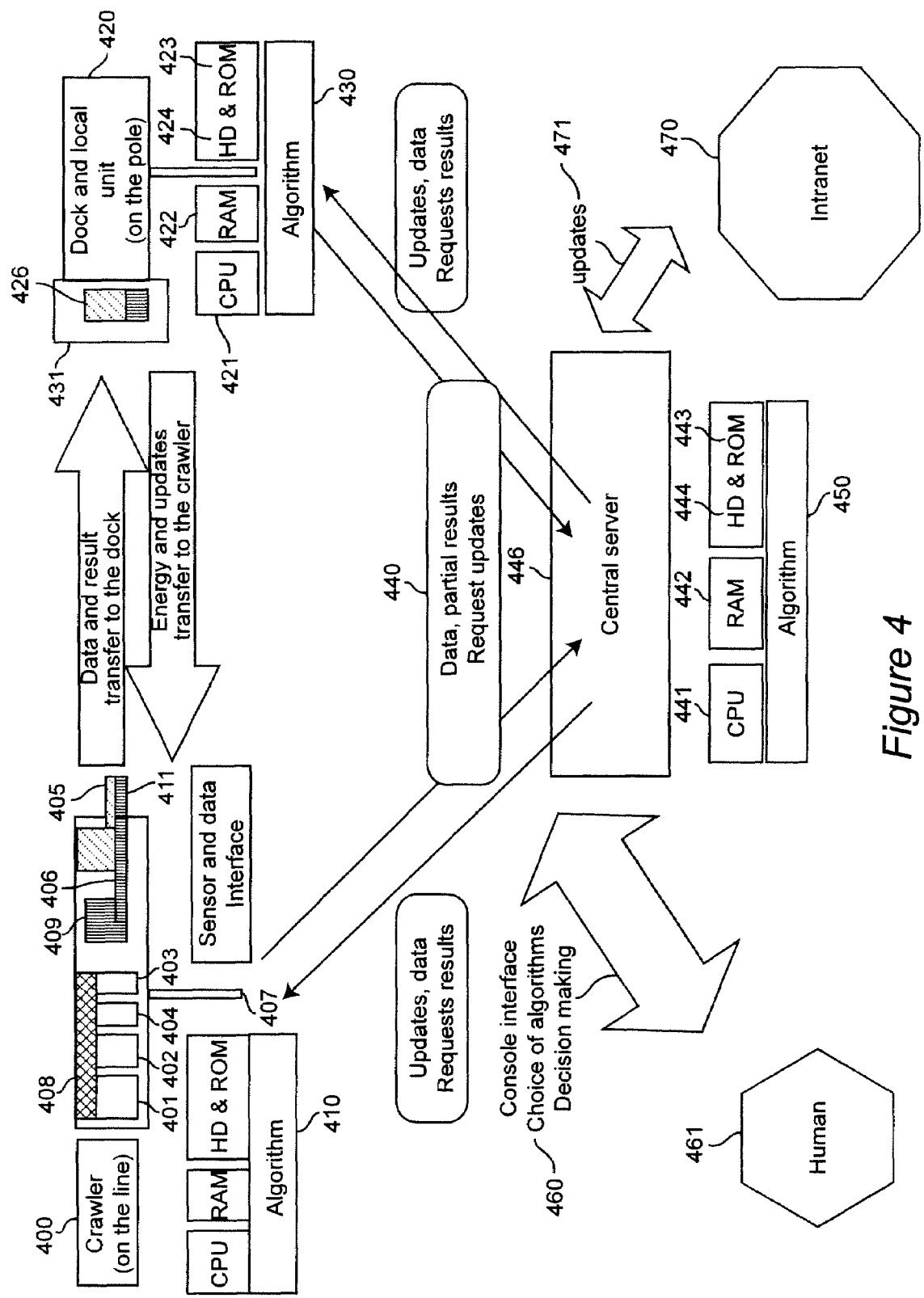
FIG. 4 is a high level block diagram illustrating the general organization of the two-stage high impedance fault detection system employing autonomic grid crawlers according to the invention.

Referring now to FIG. 4, there is shown a high level block diagram illustrating the general organization of the two-stage high impedance fault detection system employing autonomic grid crawlers according to the invention. In this example, the crawler 400 on the line interacts with a dock 420 on a pole, either or both can communicate with a central server 440. The crawler 400, as generally illustrated in FIG. 1, comprises a CPU 401, RAM 402, ROM 403, HD 404, sensor electronics 405, interface 406, GPS receiver 407, motive power system 408, and battery 409. The ROM 403 and/or HD 404 store the code which implements algorithm 410 which is executed by CPU 401 using RAM 402 as working memory in the execution of the program. The interface 406 may be either wireless or in the form of an electrical connector, as will be explained in more detail below. The dock 420 similarly includes a CPU 421, RAM 422, ROM 423, HD 424, and interface 426. The ROM 423 and/or HD 424 store the code which implements algorithm 430 which is executed by CPU 421 using RAM 422 as working memory in the execution of the program. The dock, since its position is known according to the pole on which it is mounted, requires no GPS receiver, and since it is mounted on a pole, it derives its power from the power grid itself. The crawler 400 and the dock 420 may be provided with interconnecting electrical connectors 411 and 431, respectfully, so that the crawler 400 and dock 420 can communicate with one another via interfaces 406 and 426 and so that the dock can recharge the battery 409 of the crawler. Alternatively, these connectors could be replaced by inductive coupling or other wireless connection for the purpose of communication and recharging of the crawler battery. In addition, the interface 426 of the dock could include broadband power line (BPL) interface and/or wireless interface to communicate with the central server 440. The central server 440 also comprises a CPU 441, RAM 442, ROM 443, HD 444, and an interface 446. The ROM 443 and/or HD 444 store the code which implements algorithm 450 which is executed by CPU 441 using RAM 442 as working memory in the execution of the program. The interface 446 may be either or both wireless and BPL interfaces.

In addition to these three basic components of the system, as illustrated in FIG. 4 there is also a console 460 connected to the central server 440 to provide an interface with a human operator 461. This console 460 typically would include user interface in the form of keyboard, pointing device, such as a mouse or trackball, and a display. The display provides the user with a graphic user interface (GUI) and may be a touch screen display. The central server 440 may also be connected to a network, such as the Internet or, in the example illustrated, an intranet 470. Through this connection, the central server receives updates 471 to the various programs and algorithms implemented by the central server 440, the crawler 400 and the dock 420.

In operation, the crawler 400 moves under its own power along a wire in the power grid, sensing conditions of the wire as it progresses and avoiding known obstacles, such as insulators, as described with reference to FIGS. 2A, 2B and FIGS. 3A, 3B. The sensed conditions and the locations of those conditions are stored in the HD 404. If the crawler 400 is designed to communicate directly with the central server 440, the data stored in the HD 404 is transmitted to the central server 440 in response to a polling request from the central server. If the crawler 400 is designed to communicate indirectly with the central server 440 via the dock 420, when the crawler arrives at the dock 420, a communication connection is made with the dock 420, the data in the HD 404 is uploaded to the HD 424 of the dock, and thereafter in response to a polling request from the central server 440, the date in the HD 424 of the dock is uploaded to the HD 444 of the central server 440. In either case, the data transmitted to the central server 440 is displayed on the console interface 460. The advantages of indirectly communicating data gathered by the crawler 400 to the central server 440 via the dock 420 are, first, the crawler battery power is saved and, second, preliminary processing of the data can be performed by the dock CPU 421 implementing a more powerful algorithm than that which is implemented by the crawler CPU 401.

In addition to gathering data and transmitting the data to the central processor, the system allows for remote updates to the various programs and algorithms implemented by the crawler 400, the dock 420 and the central station 440, thereby enhancing the operability of the system.

While the invention has been described in terms of a single preferred embodiment, those skilled in the art will recognize that the invention can be practiced with modification within the spirit and scope of the appended claims.

Having thus described our invention, what we claim as new and desire to secure by Letter Patent is as follows:

1. A self-propelled, automated, autonomic mechanical device which, when attached to a power network wire, travels along the wire and is able to recognize the basic states of the wire and communicates the state of the wire to a central station, the device comprising:

means adapted to engage and move along the wire;

a main body of the device supported by said means adapted to engage and move along the wire, the main body including a central processing unit (CPU), working memory, persistent memory, sensor electronics, a communication interface, a location device, motive power system for said means adapted to engage and move along the wire, and a battery; and a docking member associated with the main body for with one or more docking devices positioned at periodic intervals on poles supporting the power grid, said docking member providing one or more of a recharging path from a docking device to charge said battery, and a communication path for uploading said information that potentially indicates a fault to the docking device.

2. The device recited in claim 1, wherein the means adapted to engage and move along the wire comprises a plurality of rollers adapted to engage and roll along the wire, each of the rollers being connected to a respective one of a plurality of articulated arms, said main body of the device being connected to said plurality of articulated arms so as to be suspended from the wire by said plurality of rollers.

3. The device recited in claim 1, wherein the location device is a global position satellite (GPS) receiver.

4. The device recited in claim 1, wherein the persistent memory includes read only memory (ROM) and a hard drive (HD).

5. The device recited in claim 1, wherein said docking member provides a recharging path from a docking device to charge said battery.

6. The device recited in claim 1, wherein said docking member provides a communication path for uploading said information that potentially indicates a fault to a docking device.

7. The self-propelled, automated, autonomic mechanical device of claim 1,
wherein said persistent memory stores pre-analysis and pre-qualifying algorithms used by the CPU;
wherein said sensor electronics collects data of various types of faults and conditions of said wire, and inputs the data of various types of faults and conditions into the CPU;
wherein said CPU analyzes said data from the sensor electronics using said pre-analysis and pre-qualifying algorithms from the persistent memory, after the pre-analysis and pre-qualification algorithms identify indications of a potential fault, transmits information via said communication interface to the central station, the information including location of the potential fault as determined by said location device.

8. A system for detecting high impedance faults in a power grid comprising:

a plurality of self-propelled, automated, autonomic mechanical devices which, when attached to power network wires, travel along the wires and are able to recognize the basic states of the wires, wherein each of said plurality of self-propelled, automated, autonomic mechanical devices comprises means adapted to engage and move along the wire, and a main body of the device supported by said means adapted to engage and move along the wire, the main body including a central processing unit (CPU), working memory, persistent memory, sensor electronics, a communication interface, a location device, motive power system for said means adapted to engage and move along the wire, and a battery, and wherein each of said plurality of self-propelled, automated, autonomic mechanical devices comprises a docking means associated with the main body for with one or more docking devices positioned at periodic intervals on poles supporting the power grid, said docking means providing one or more of a recharging path from a docking device to charge said battery, and a communication path for uploading said information that potentially indicates a fault to the docking device, wherein said persistent memory stores pre-analysis and pre-qualifying algorithms used by the CPU;

wherein said sensor electronics collects data of various types of faults and conditions of said wire, and inputs the data of various types of faults and conditions into the CPU;

wherein said CPU analyzes said data from the sensor electronics using said pre-analysis and pre-qualifying algorithms from the persistent memory, after the pre-analysis and pre-qualification algorithms identify indications of a potential fault, transmits information via said communication interface to the central station, the information including location of the potential fault as determined by said location device;

a plurality of docking devices mounted at intervals on poles supporting said power grid, each of said plurality of docking devices being able to dock with said docking means on each of said plurality of self-propelled, automated, autonomic mechanical devices, and a central station in communication with each of said plurality of self-propelled, automated, autonomic mechanical devices and receiving information of potential faults and their locations in the power grid.

9. The system recited in claim 8, wherein said docking means provides a recharging path from the docking device to charge said battery.

10. The system recited in claim 8, wherein said docking means provides a communication path for uploading said information that potentially indicates a fault to the docking device, said docking device being communication with said central station to transmit said uploaded information.

11. A method of detecting high impedance faults in a power grid comprising the steps of:
deploying a plurality of self-propelled, automated, autonomic mechanical devices which are attached to a power network wires to travel along the wires, each of said plurality of self-propelled, automated, autonomic mechanical devices being able to recognize basic states of the wires; and
mounting a plurality of docking devices at periodic intervals on poles supporting the power grid; and
communicating to a central station by each of said plurality of self-propelled automated, autonomic mechanical devices information of potential faults and their locations in the power grid; and
engaging one of said plurality of self-propelled, automated, autonomic mechanical devices by one of said plurality of docking devices when said one of said plurality of self-propelled, automated, autonomic mechanical devices comes into proximity with one of said plurality of docking devices.

12. The method recited in claim 11, further comprising the step of recharging a battery of said one of said plurality of self-propelled, automated, autonomic mechanical devices by said one of said plurality of docking devices.

13. The method recited in claim 11, further comprising the steps of:
uploading fault and location information from said one of said plurality of self-propelled, automated, autonomic mechanical devices to said one of said plurality of docking devices; and
communicating said uploaded information from said one of said plurality of docking devices to said central station.

* * * * *